(12) United States Patent
Hiroki et al.

(10) Patent No.: US 11,703,750 B2
(45) Date of Patent: Jul. 18, 2023

(54) ILLUMINATOR AND PROJECTOR

(71) Applicant: SEIKO EPSON CORPORATION, Tokyo (JP)

(72) Inventors: Mizuha Hiroki, Zama (JP); Koya Shiratori, Matsumoto (JP); Shinichi Yotsuya, Chino (JP); Tetsuo Shimizu, Matsumoto (JP); Ryuta Koizumi, Shiojiri (JP); Shoichi Uchiyama, Nagano-ken (JP); Tomoko Akagawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/698,136

(22) Filed: Mar. 18, 2022

(65) Prior Publication Data

US 2022/0299854 A1 Sep. 22, 2022

(30) Foreign Application Priority Data

Mar. 19, 2021 (JP) .................................. 2021-045363

(51) Int. Cl.
*G03B 21/20* (2006.01)
(52) U.S. Cl.
CPC ....... *G03B 21/2066* (2013.01); *G03B 21/204* (2013.01)
(58) Field of Classification Search
CPC .............. G03B 21/204; G03B 21/2066; G03B 21/2073
See application file for complete search history.

(56) References Cited

U.S. PATENT DOCUMENTS

| 2010/0020400 | A1* | 1/2010 | Amako | ............. | B23K 26/0673 |
| | | | | | 430/321 |
| 2010/0224894 | A1* | 9/2010 | Kim | ...................... | H01L 33/007 |
| | | | | | 257/E33.074 |
| 2012/0138985 | A1* | 6/2012 | Ono | .................. | H01L 21/02458 |
| | | | | | 257/E33.074 |

(Continued)

FOREIGN PATENT DOCUMENTS

| JP | 2017-097310 A | 6/2017 |
| JP | 2017-194523 A | 10/2017 |

(Continued)

*Primary Examiner* — Magda Cruz
(74) *Attorney, Agent, or Firm* — Dority & Manning, P.A.

(57) ABSTRACT

An illuminator includes a light source that outputs first light, a wavelength converter that converts the first light into second light, an optical element that reflects the first light toward the wavelength converter and transmits the second light, and an illumination system which is disposed on the opposite side of the optical element from the wavelength converter. The wavelength converter includes a substrate, a reflection layer facing a first surface of the substrate, a wavelength conversion layer having a second surface and facing the reflection layer, and a structural element facing the second surface and having a plurality of protrusions that reflect part of the first light. The plurality of protrusions each have an inclining surface that inclines with respect to the second surface, and at least part of the first light and reflected off the inclining surface enters the illumination system without traveling via the optical element.

10 Claims, 15 Drawing Sheets

(56) References Cited

U.S. PATENT DOCUMENTS

| | | | |
|---|---|---|---|
| 2014/0268063 A1* | 9/2014 | Akiyama | G03B 21/2073 |
| | | | 362/19 |
| 2015/0301438 A1* | 10/2015 | Akiyama | G03B 21/204 |
| | | | 362/19 |
| 2016/0247965 A1* | 8/2016 | Kajita | H01L 33/32 |
| 2017/0153538 A1 | 6/2017 | Kawasumi | |
| 2018/0373132 A1 | 12/2018 | Miyazaki | |
| 2019/0302588 A1* | 10/2019 | Yanai | G03B 21/204 |

FOREIGN PATENT DOCUMENTS

| | | |
|---|---|---|
| JP | 2017-215549 A | 12/2017 |
| JP | 2019-008193 A | 1/2019 |

\* cited by examiner

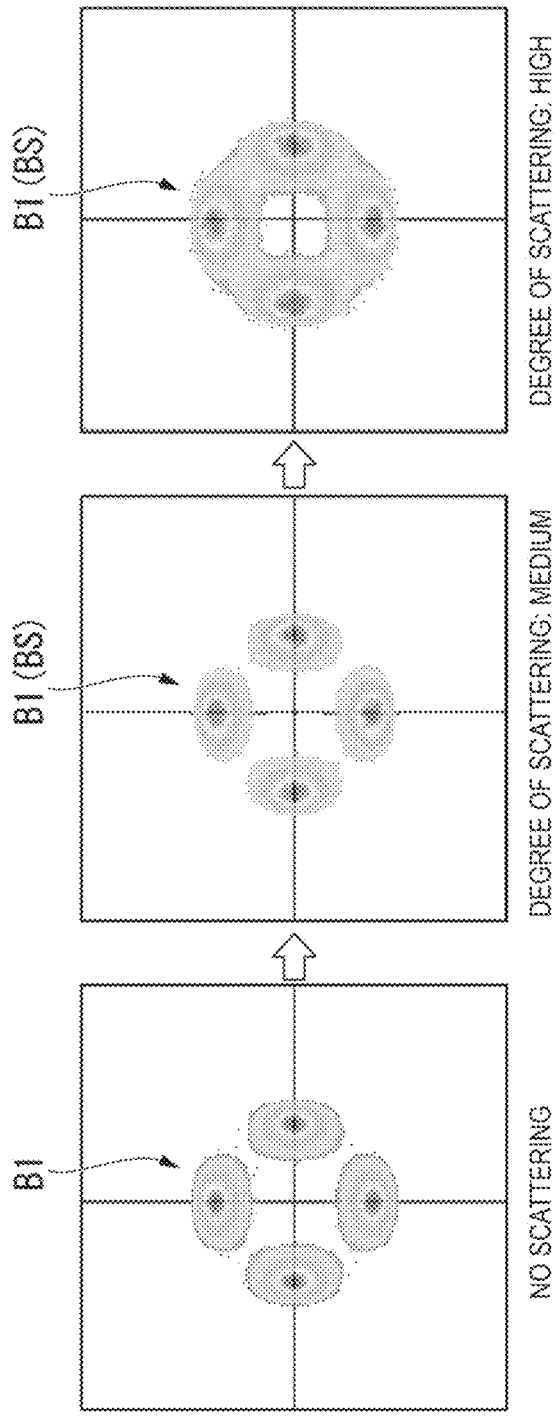

ILLUMINATOR AND PROJECTOR

The present application is based on, and claims priority from JP Application Serial Number 2021-045363, filed Mar. 19, 2021, the disclosure of which is hereby incorporated by reference herein in its entirety.

BACKGROUND

1. Technical Field

The present disclosure relates to an illuminator and a projector.

2. Related Art

There is an illuminator of related art that causes part of first-wavelength light to be scattered by and reflected off a light scattering surface provided at the surface of a wavelength conversion layer, combines the scattered and reflected first-wavelength light with second-wavelength fluorescence that is the result of wavelength conversion of the first-wavelength light that enters the wavelength conversion layer, and outputs the resultant white illumination light (see, for example, JP-A-2017-215549 and JP-A-2017-194523).

In the illuminator described above, however, the angle at which the first-wavelength light is scattered is insufficient, and there is therefore room for improvement in scattering characteristic control, so that the first-wavelength light cannot be efficiently extracted as the illumination light, resulting in a problem of a decrease in light utilization efficiency.

SUMMARY

To solve the problem described above, according to a first aspect of the present disclosure, there is provided an illuminator including a light source that outputs first light having a first wavelength band, a wavelength converter that converts the first light into second light having a second wavelength band different from the first wavelength band, an optical element that reflects the first light outputted from the light source toward the wavelength converter and transmits the second light, and an illumination system which is disposed on an opposite side of the optical element from the wavelength converter and which light emitted from the wavelength converter enters. The wavelength converter includes a substrate having a first surface, a reflection layer facing the first surface, a wavelength conversion layer having a second surface and facing the reflection layer, the wavelength conversion layer being configured to convert the first light into the second light, and a structural element facing the second surface and having a plurality of protrusions that reflect part of the first light. The plurality of protrusions each have an inclining surface that inclines with respect to the second surface, and at least part of the first light reflected off the inclining surface enters the illumination system without traveling via the optical element.

According to a second aspect of the present disclosure, there is provided a projector including the illuminator according to the first aspect of the present disclosure, a light modulator that modulates light from the illuminator in accordance with image information, and a projection optical apparatus that projects the light modulated by the light modulator.

BRIEF DESCRIPTION OF THE DRAWINGS

FIG. 13 shows the illuminance distribution of the blue reflected light in the second embodiment.

DESCRIPTION OF EXEMPLARY EMBODIMENTS

Embodiments of the present disclosure will be described below with reference to the drawings.

A projector according to the embodiments of the present disclosure is an example of a projector using a liquid crystal panel as a light modulator.

In the following drawings, components are drawn at different dimensional scales in some cases for clarification of each of the components.

First Embodiment

Figure 1:
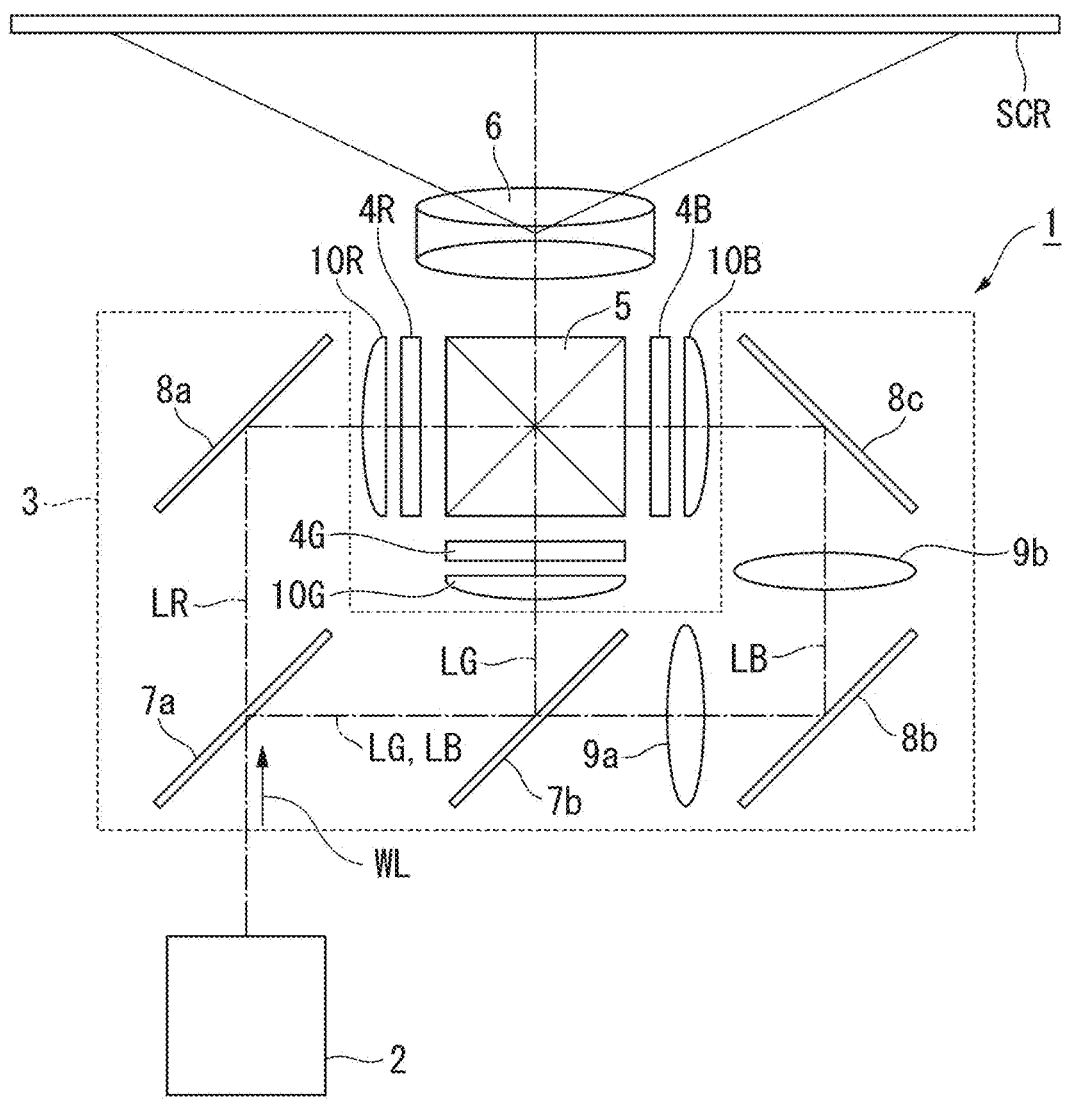
FIG. 1 shows the configuration of a projector according to a first embodiment.

FIG. 1 shows the configuration of the projector according to the present embodiment.

A projector 1 according to the present embodiment shown in FIG. 1 is a projection-type image display apparatus that displays a color image on a screen (projection receiving surface) SCR. The projector 1 uses three light modulators corresponding to red light LR, green light LG, and blue light LB.

The projector 1 includes an illuminator 2, a color separation system 3, light modulators 4R, 4G, and 4B, a light combining system 5, and a projection optical apparatus 6.

The illuminator 2 outputs white illumination light WL toward the color separation system 3. The color separation system 3 separates the white illumination light WL into the red light LR, the green light LG, and the blue light LB. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL from the illuminator 2 into the red light LR and the other light (green light LG and blue light LB). The first dichroic mirror 7a transmits the separated red light LR and reflects the other light (green light LG and blue light LB). On the other hand, the second dichroic mirror 7b separates the other light into the green light LG and the blue light LB. The second dichroic mirror 7b reflects the separated green light LG and transmits the separated blue light LB.

The first reflection mirror 8a is disposed in the optical path of the red light LR and reflects the red light LR having passed through the first dichroic mirror 7a toward the light modulator 4R. On the other hand, the second reflection mirror 8b and the third reflection mirror 8c are disposed in the optical path of the blue light LB and reflect the blue light LB having passed through the second dichroic mirror 7b toward the light modulator 4B. The green light LG is reflected off the second dichroic mirror 7b toward the light modulator 4G.

The first relay lens 9a and the second relay lens 9b are disposed in the optical path of the blue light LB on the light exiting side of the second dichroic mirror 7b. The first relay lens 9a and the second relay lens 9b correct a difference in the illumination distribution of the blue light LB resulting from the fact that the optical path length of the blue light LB is longer than the optical path lengths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed on the light incident side and the light exiting side of each of the liquid crystal panels and configured to transmit only linearly polarized light polarized in a specific direction.

Field lenses 10R, 10G, and 10B are disposed on the light incident side of the light modulators 4R, 4G, and 4B, respectively. The field lenses 10R, 10G, and 10B parallelize the chief rays of the red light LR, the green light LG, and the blue light LB to be incident on the respective light modulators 4R, 4G, and 4B.

The light combining system 5 receives the image light outputted from the light modulator 4R, the image light outputted from the light modulator 4G, and the image light outputted from the light modulator 4B, combines the image light corresponding to the red light LR, the image light corresponding to the green light LG, and the image light corresponding to the blue light LB with one another, and outputs the combined image light toward the projection optical apparatus 6. The light combining system 5 is, for example, a cross dichroic prism.

The projection optical apparatus 6 is formed of a plurality of projection lenses. The projection optical apparatus 6 enlarges the image light combined by the light combining system 5 and projects the enlarged image light toward the screen SCR. An image is thus displayed on the screen SCR.

An example of the illuminator 2 according to the present embodiment will be described.

Figure 2:
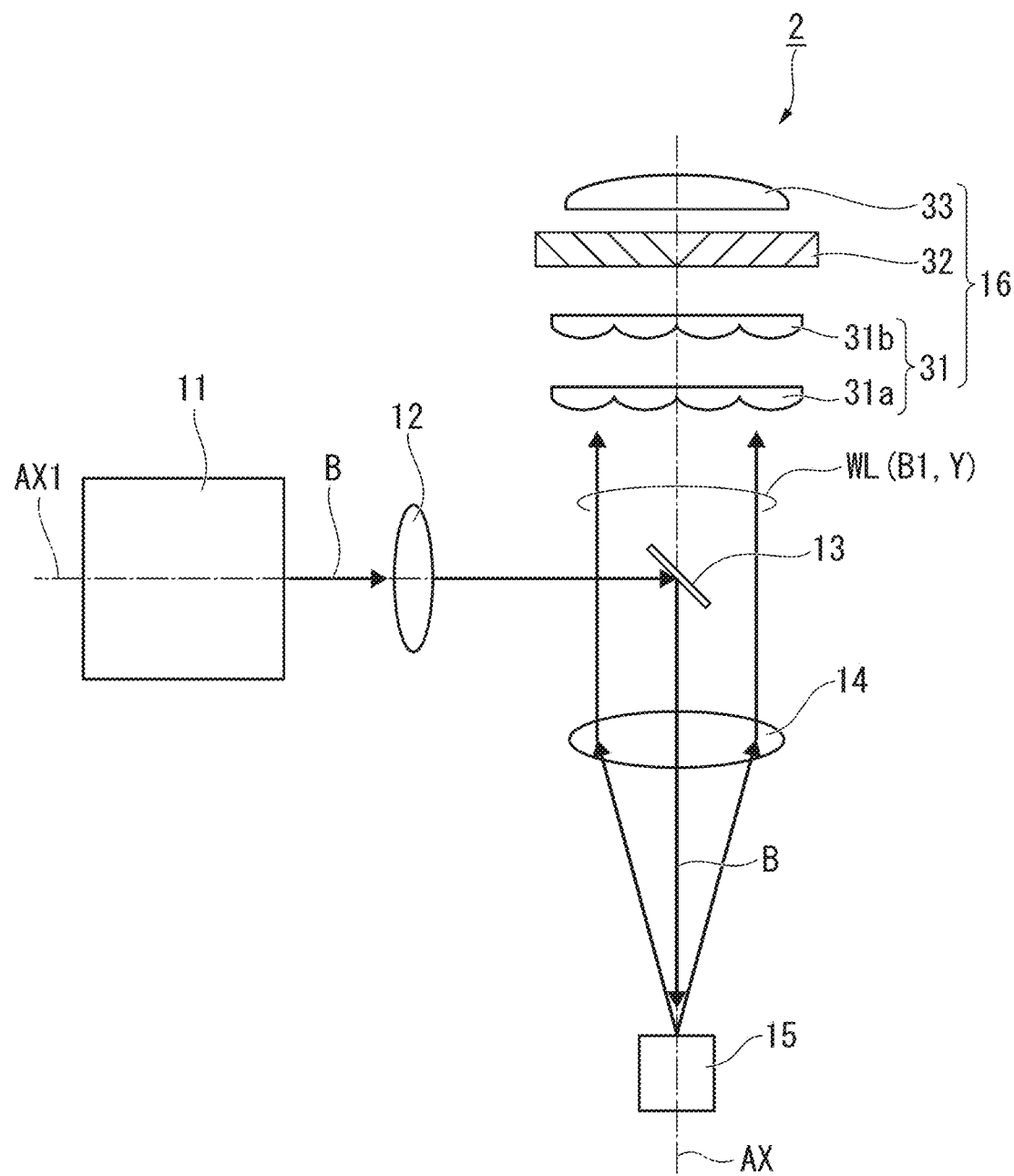
FIG. 2 shows a schematic configuration of an illuminator.

FIG. 2 shows a schematic configuration of the illuminator 2.

The illuminator 2 includes a light source 11, a first optical system 12, an optical element 13, a second optical system 14, a wavelength converter 15, and an illumination system 16, as shown in FIG. 2. The light source 11, the first optical system 12, and the optical element 13 are arranged along a light source optical axis AX1. The wavelength converter 15, the second optical system 14, the optical element 13, and the illumination system 16 are arranged along an illumination optical axis AX of the illuminator 2. The light source optical axis AX1 and the illumination optical axis AX are perpendicular to each other.

The light source 11 outputs first light B. The first light B is light having a first wavelength band. The first wavelength band of the first light B ranges, for example, from 450 to 460 nm, and the wavelength at which the intensity of the outputted first light B peaks, for example, at 455 nm. That is, the first light B is blue light. The light source 11 is formed of at least one semiconductor laser. The semiconductor laser may output the first light B having a peak wavelength other than 455 nm. The light source 11 includes a collimator lens (not shown) provided in correspondence with the semiconductor laser. The thus configured light source 11 converts the first light B outputted from the semiconductor laser into parallelized light and outputs the parallelized light.

The first light B outputted from the light source 11 enters the first optical system 12. The first optical system 12 includes at least one convex lens, which focuses the first light B and causes the focused first light B to be incident on the optical element 13.

The optical element 13 is disposed in the vicinity of the focal point of the first optical system 12. The first light B is thus focused and incident on the optical element 13 with the luminous flux diameter of the focused first light B substantially minimized. The configuration in which the focused first light B is incident on the optical element 13 allows reduction in the size of the optical element 13.

The optical element 13 is a dichroic mirror having optical properties that reflect the first light B having the first wavelength band and transmit second light Y having a second wavelength band and emitted from the wavelength converter 15, which will be described later. The optical element 13 is formed of a dielectric multilayer film.

In the present embodiment, the second optical system 14 includes at least one convex lens, which focuses the first light B and causes the focused first light B to enter the wavelength converter 15.

The illumination system 16 is disposed on the opposite side of the optical element 13 from the wavelength converter 15, and the illumination light WL, which is the light emitted from the wavelength converter 15, enters the illumination system 16. The illumination light WL will be described later.

Figure 3:
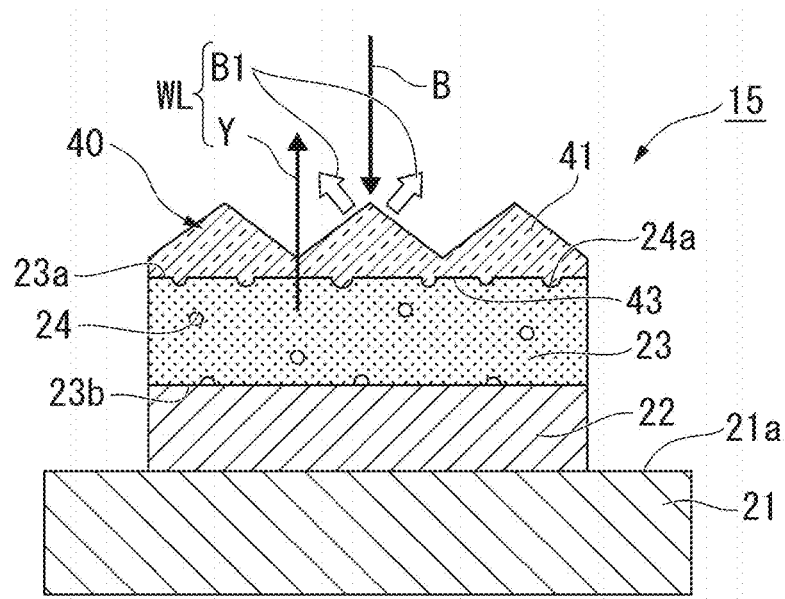
FIG. 3 is a cross-sectional view showing the configuration of a wavelength converter.

FIG. 3 is a cross-sectional view showing the configuration of the wavelength converter 15.

The wavelength converter 15 includes a substrate 21, a reflection layer 22, a wavelength conversion layer 23, and a structural element 40, as shown in FIG. 3. The substrate 21 has an upper surface (first surface) 21a. The substrate 21 is not only a support substrate that supports the reflection layer 22, the wavelength conversion layer 23, and the structural element 40 but a heat dissipation substrate that dissipates heat conducted from the wavelength conversion layer 23. The substrate 21 can be made of a material having high thermal conductivity, for example, a metal or ceramic material.

The reflection layer 22 is provided at the upper surface 21a of the substrate 21. That is, the reflection layer 22 is located between the substrate 21 and the wavelength conversion layer 23 and reflects light incident from the wavelength conversion layer 23 toward the wavelength conversion layer 23. The reflection layer 22 is formed of a laminated film including a dielectric multilayer film, a metal mirror, an enhanced reflection film, and other films.

The wavelength conversion layer 23 is provided so as to face the reflection layer 22. In the present embodiment, the wavelength conversion layer 23 is provided on the reflection layer 22. The wavelength conversion layer 23 has an upper surface (second surface) 23a, on which the first light B is incident, and a lower surface 23b, which differs from the upper surface 23a. The wavelength conversion layer 23 converts the first light B having the first wavelength band into the second light Y having the second wavelength band different from the first wavelength band.

The wavelength conversion layer 23 may contain a ceramic phosphor or a single crystal phosphor. The second wavelength band ranges, for example, from 500 to 680 nm. That is, the second light Y is yellow light containing a green light component and a red light component.

The wavelength conversion layer 23 contains, for example, an yttrium-aluminum-garnet-based (YAG-based) phosphor. Consider YAG:Ce, which contains cerium (Ce) as an activator, by way of example, and the wavelength conversion layer 23 can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method. When a porous sintered element is used as the wavelength conversion layer 23, light is scattered inside the phosphor so that the light is unlikely to propagate laterally, which is desirable also from the viewpoint of light utilization efficiency.

In the present embodiment, the wavelength conversion layer 23 contains a plurality of pores 24 provided therein. The plurality of pores 24 impart a light scattering property to the wavelength conversion layer 23. Part of the plurality of pores 24 are exposed via the upper surface 23a of the wavelength conversion layer 23. The pores 24 exposed via the upper surface 23a form recesses 24a in the upper surface 23a.

The structural element 40 is provided so as to face the upper surface 23a of the wavelength conversion layer 23. The structural element 40 reflects part of the first light B. The structural element 40 has a plurality of protrusions 41.

In the present embodiment, the plurality of protrusions 41 each have a quadrangular pyramidal shape.

At least part of the structural element 40 is formed so as to fill the recesses 24a. The area where the structural element 40 is in contact with the wavelength conversion layer 23 thus increases, and the increased contact area provides an anchor effect of improving close contact of the structural element 40 with the wavelength conversion layer 23. An undesirable situation in which the structural element 40 peels off the wavelength conversion layer 23 can therefore be avoided.

In the present embodiment, the structural element 40 is formed separately from the wavelength conversion layer 23.

Figure 4A:
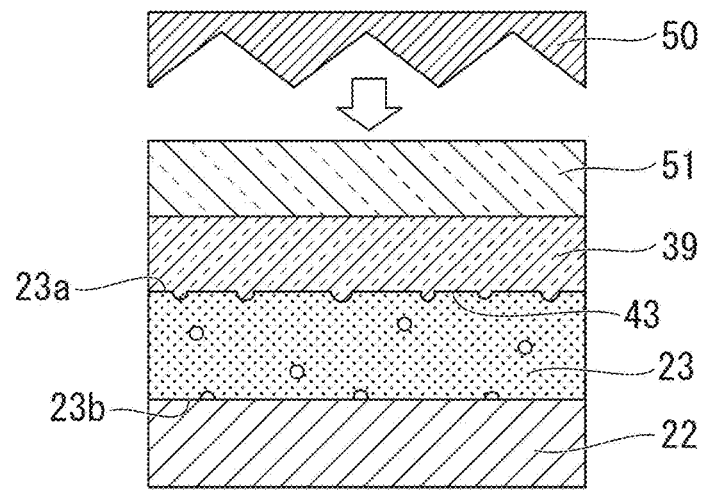
FIG. 4A shows a method for manufacturing a structural element.
Figure 4B:
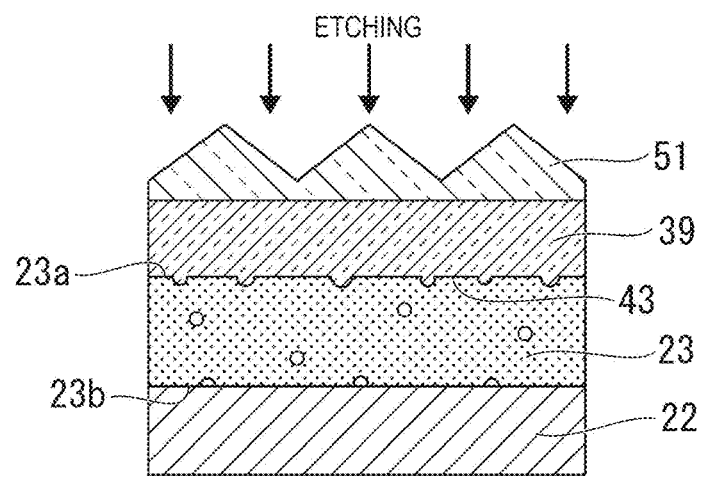
FIG. 4B shows the method for manufacturing the structural element.
Figure 4C:
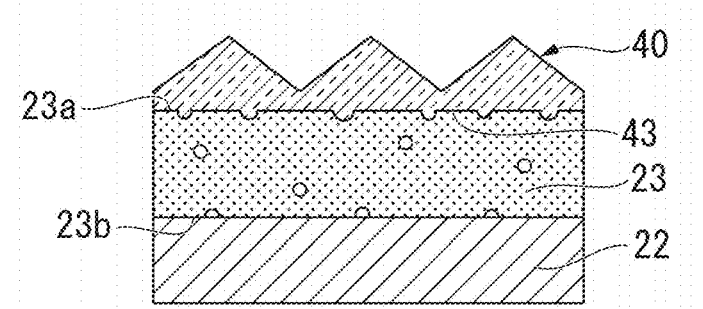
FIG. 4C shows the method for manufacturing the structural element.

FIGS. 4A to 4C show a method for manufacturing the structural element 40.

To manufacture the structural element 40, a structural element forming layer 39 is first formed at the upper surface 23a of the wavelength conversion layer 23 by depositing a material for forming the structural element 40 in the process using, for example, evaporation, sputtering, CVD, or application, as shown in FIG. 4A. A mold member 50 corresponding to the shape of the structural element 40 is then pressed in an imprint process against a resin layer 51 formed on the structural element forming layer 36 to transfer the uneven shape of the structural element 40 onto the resin layer 51, as shown in FIG. 4B. An etching process is then carried out by using the resin layer 51 having the transferred uneven shape as a mask. The structural element 40 is thus formed on the wavelength conversion layer 23.

The structural element 40 is preferably made of a chemically stable material that absorbs only a small amount of light. In the present embodiment, the structural element 40 can be made of a material having a refractive index ranging from 1.3 to 1.7, for example, $SiO_2$ or SiON. For example, the structural element 40 made of $SiO_2$ can be processed with high precision in a wet or dry etching process.

In the present embodiment, the focused first light B is incident on the wavelength converter 15. Part of the first light B passes through the structural element 40 provided at the upper surface 23a of the wavelength conversion layer 23, and the other part of the first light B is reflected off the structural element 40. Part of the first light B having passed through the structural element 40 is converted into the second light Y in the wavelength conversion layer 23. The other part of the first light B reflected off and outputted from the structural element 40 will be hereinafter referred to as blue reflected light B1.

In the present embodiment, the structural element 40 is made of a material that absorbs only a small amount of light, whereby the structural element 40 absorbs only a small amount of the second light Y generated in the wavelength conversion layer 23. Therefore, in the wavelength converter 15 in the present embodiment, the second light Y generated in the wavelength conversion layer 23 passes through the structural element 40 and efficiently exits out thereof.

The illuminator 2 according to the present embodiment outputs the white illumination light WL containing the blue reflected light B1 and the second light Y from the wavelength converter 15 toward the second optical system 14. The illumination light WL is substantially parallelized by the second optical system 14. The illumination light WL having passed through the second optical system 14 passes through the optical element 13 disposed in the illumination optical axis AX.

The optical element 13 has optical properties that reflect the first light B and transmit the second light Y. The second light Y contained in the illumination light WL therefore passes through the optical element 13 and travels toward the illumination system 16. Since the second light Y passes through the optical element 13, optical loss of the second light Y caused by the optical element 13 can be reduced.

On the other hand, the blue reflected light B1 contained in the illumination light WL has the same first wavelength band as the first light B and is therefore reflected off the optical element 13. The blue reflected light B1 reflected off the optical element 13 returns toward the light source 11 and cannot therefore be extracted as the illumination light WL out of the illuminator 2, resulting in optical loss. In the illuminator 2 according to the present embodiment, the structural element 40 provided at the upper surface 23*a* of the wavelength conversion layer 23 is skillfully shaped so as to reduce the optical loss of the blue reflected light B1, as will be described later.

Figure 5A:
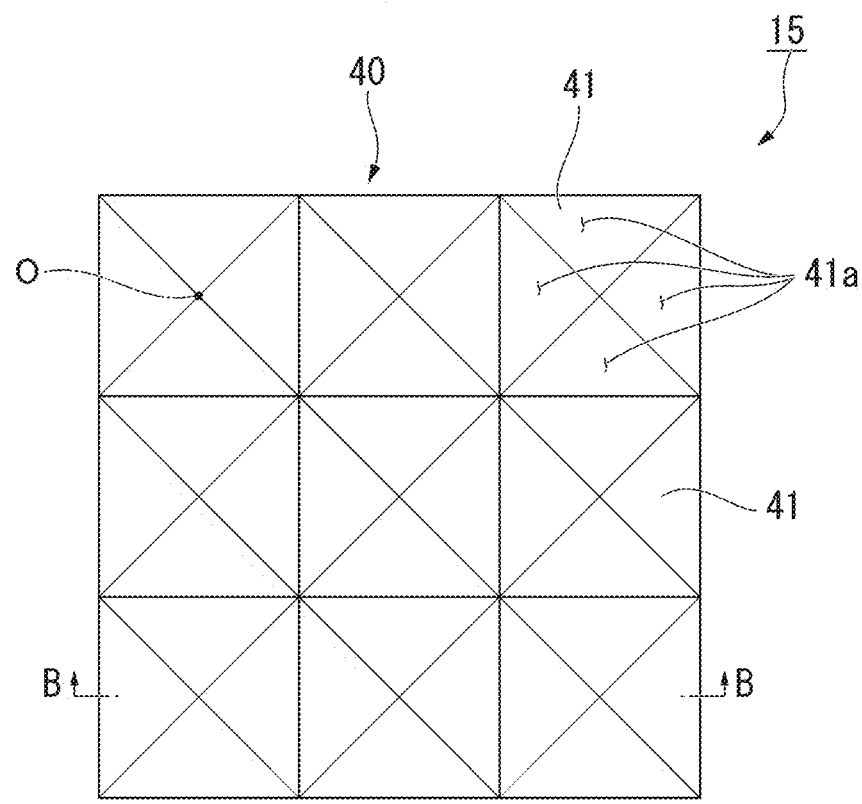
FIG. 5A is an enlarged plan view showing key parts and describing first light reflected off the structural element.
Figure 5B:
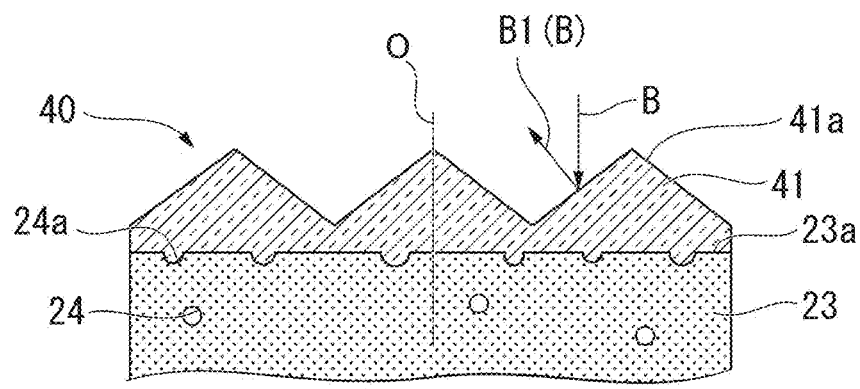
FIG. 5B is a cross-sectional view taken along the line B-B in FIG. 5A.

FIG. 5A shows the planar configuration of the structural element 40, and FIG. 5B shows the cross-sectional configuration of the structural element 40. In FIGS. 5A and 5B, the axis passing through the center of each of the protrusions 41, which each have a quadrangular pyramidal shape, is called a center axis O.

In the present embodiment, the plurality of protrusions 41, which form the structural element 40, are arranged without gaps therebetween at the upper surface 23*a* of the wavelength conversion layer 23, as shown in FIGS. 5A and 5B. The plurality of protrusions 41 each have inclining surfaces 41*a*, which incline with respect to the upper surface 23*a* of the wavelength conversion layer 23. That is, in the present embodiment, the surfaces of each of the protrusions 41 are the inclining surfaces 41*a*, which incline with respect to the upper surface 23*a* of the wavelength conversion layer 23.

Consider now a case where no structural element is provided at the upper surface 23*a* of the wavelength conversion layer 23. In this case, part of the first light B enters the second optical system 14 as scattered reflected light isotropically scattered by the upper surface 23*a* of the wavelength conversion layer 23. Part of the scattered reflected light parallelized by the second optical system 14 is incident again on the optical element 13 disposed above the second optical system 14. Since the optical element 13 has optical properties that reflect the first light B having the first wavelength band as described above, the scattered reflected light incident on the optical element 13 is reflected toward the light source 11 and becomes a loss.

According to the wavelength converter 15 in the present embodiment, the surfaces of each of the protrusions 41 are the inclining surfaces 41*a*, as described above. The first light B incident on the structural element 40 is therefore reflected in oblique directions with respect to a normal to the upper surface 23*a*. That is, the first light B reflected off the protrusions 41 of the structural element 40 is reflected off the protrusions 41 in obliquely upward directions away from the center axis O of each of the protrusions 41, instead of being reflected along the optical path along which the first light B is incident on the protrusions 41. According to the wavelength converter 15 in the present embodiment, the first light B can be reflected by a greater amount in the oblique directions than in the vertical direction.

In the structural element 40 in the present embodiment, the protrusions 41 each have a quadrangular pyramidal shape. The protrusions 41 each have four inclining surfaces 41*a* facing in directions different from the direction of the center axis O when viewed in the direction along the center axis O. The protrusions 41 thus each scatter and reflect the light incident thereon in four directions corresponding to the inclining surfaces 41*a*. The first light B reflected off and outputted from the structural element 40 will be hereinafter referred to as the blue reflected light B1.

Figure 6:
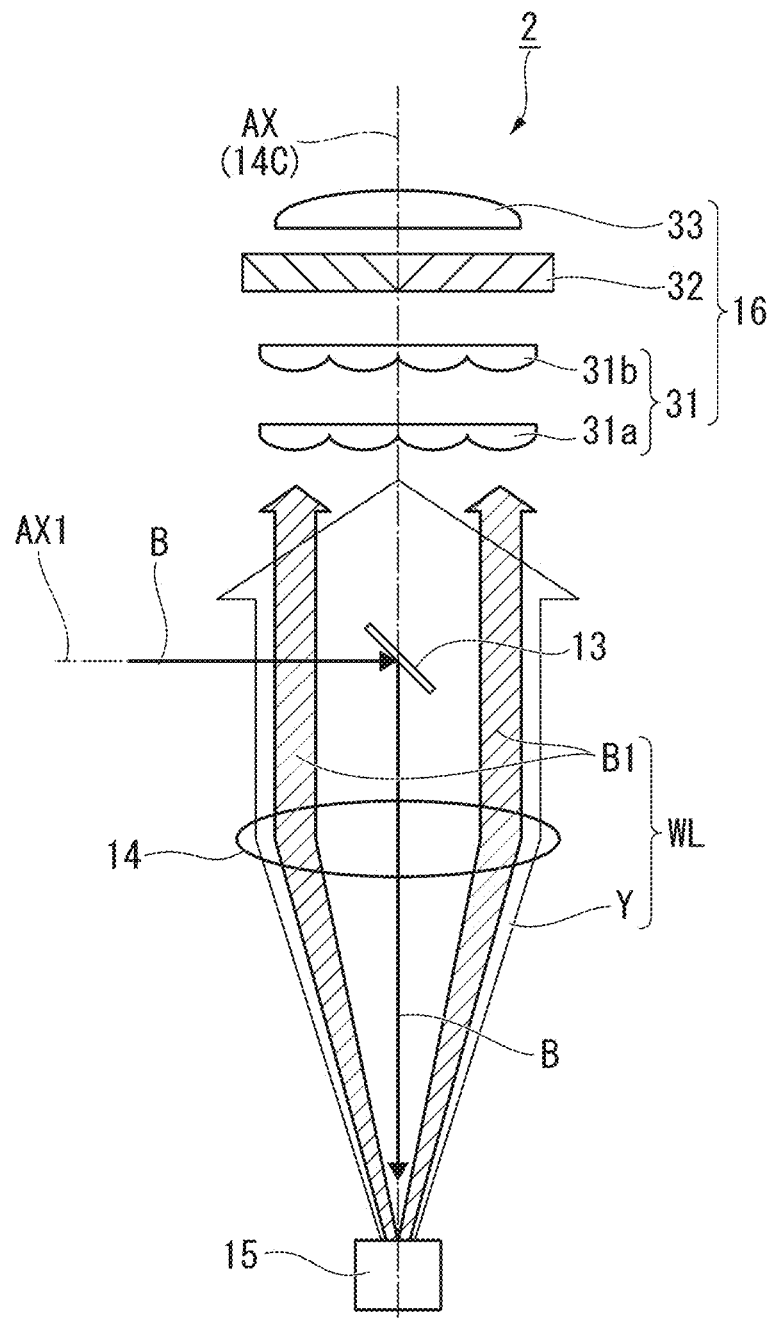
FIG. 6 is a conceptual view showing the state of the light emitted from the wavelength converter.

FIG. 6 is a conceptual view showing the state of the light emitted from the wavelength converter 15.

In the wavelength converter 15, the structural element 40 reflects the blue reflected light B1 by a greater amount in the oblique directions than in the vertical direction, as shown in FIG. 6. That is, in the present embodiment, the blue reflected light B1 outputted from the wavelength converter 15 has a light orientation distribution containing more obliquely oriented components than vertically oriented components.

The blue reflected light B1 reflected off the structural element 40 thus enters the second optical system 14 via optical paths outside an optical axis 14C of the second optical system 14, instead of the optical path of the first light B that enters the wavelength converter 15. The blue reflected light B1 therefore passes through a radially outer region of the lens that forms the second optical system 14. The optical axis 14C coincides with the illumination optical axis AX.

According to the wavelength converter 15 in the present embodiment, the blue reflected light B1 is scattered and reflected so as to pass a region outside the optical axis 14C of the second optical system 14 instead of passing along the optical path of the incoming first light B, whereby the blue reflected light B1 can be outputted so as not to be incident on the optical element 13 disposed in the optical axis 14C of the second optical system 14.

Figure 7:
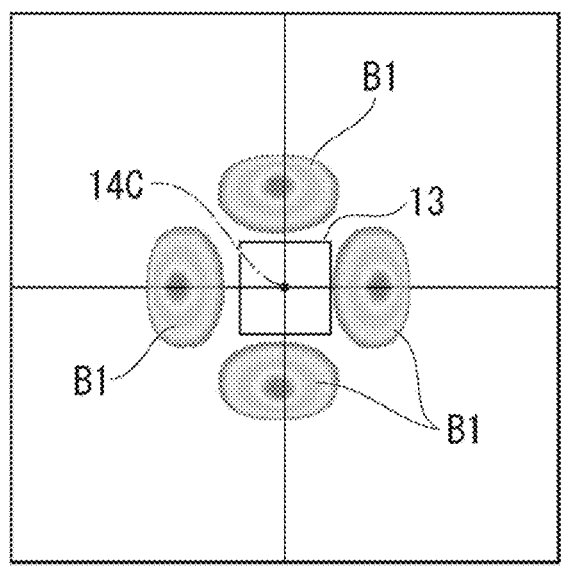
FIG. 7 shows the illuminance distribution of blue reflected light.

FIG. 7 shows the illuminance distribution of blue reflected light B1. FIG. 7 shows the illumination distribution of the blue reflected light B1 on the light incident surface of the illumination system 16 viewed in the direction along the optical axis 14C of the second optical system 14.

Most of the blue reflected light B1 outputted from the wavelength converter 15 in the present embodiment is not incident on the optical element 13 located in the optical axis 14C of the second optical system 14 but enters the illumination system 16 without traveling via the optical element 13, as shown in FIG. 7. In the present embodiment, the inclining surfaces 41*a* of each of the protrusions 41 of the structural element 40 scatter and reflect the first light B in the four directions, so that the blue reflected light B1 is formed of four luminous fluxes arranged around the optical element 13.

According to the wavelength converter 15 in the present embodiment, the amount of the blue reflected light B1 incident on the optical element 13 is suppressed, whereby the optical loss of the blue reflected light B1 caused by the optical element 13 can be reduced.

The present inventors have focused on the fact that the loss of blue reflected light B1 caused by the optical element 13 varies in accordance with the inclination angle of the inclining surfaces 41*a* of each of the protrusions 41. The present inventors have then conducted a simulation of the loss of the blue reflected light B1 resulting from a change in the inclination angle of the inclining surfaces 41*a*. The inclination angle is the angle between the inclining surfaces 41*a* and the upper surface 23*a* of the wavelength conversion layer 23.

Figure 8A:
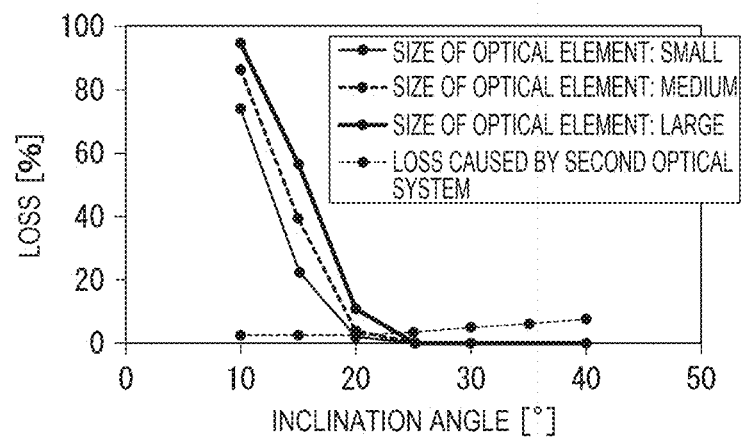
FIG. 8A show graphs illustrating the results of a simulation on the loss of the blue reflected light.
Figure 8B:
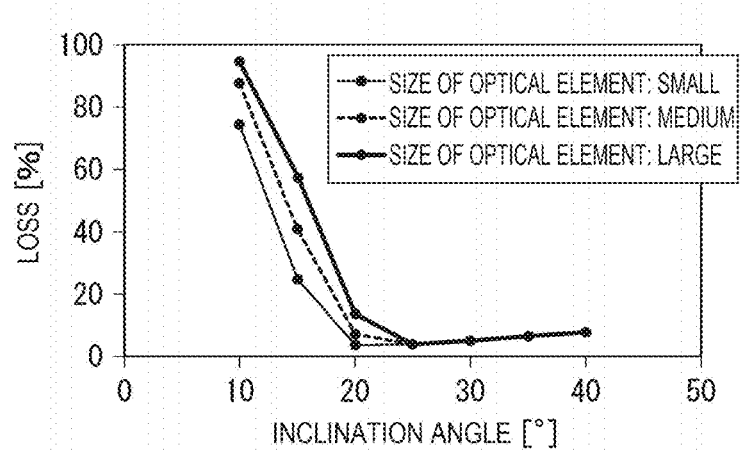
FIG. 8B show graphs illustrating the results of the simulation on the loss of the blue reflected light.

FIGS. 8A and 8B are graphs showing the results of the simulation on the loss of the blue reflected light. FIG. 8A is a graph showing the relationship between the inclination angle of the inclining surfaces 41*a* and the optical loss caused by the optical element 13 and the relationship between the inclination angle of the inclining surfaces 41*a* and the optical loss caused by the second optical system 14. FIG. 8B is a graph representing the sum of the optical loss caused by the optical element 13 and the optical loss caused by the second optical system 14 based on the results shown in FIG. 8A. In FIGS. 8A and 8B, the horizontal axis represents the inclination angle of the inclining surfaces 41a, and the vertical axis represents the optical loss. FIGS. 8A and 8B further show the results of the simulation obtained when the size of the optical element 13 is changed. The conditions of the present simulation are, for example, as follows: The range of the angle of incidence of the first light incident on the structural element is set at ±15 degrees; and the area, of the wavelength conversion layer 23, on which the first light B is incident is set at 20 mm.

It is noted that the optical loss caused by the optical element 13 is the ratio of the amount of light incident on the optical element 13 to the total amount of the blue reflected light B1 reflected off the structural element 40. It is further noted that the optical loss caused by the second optical system 14 is the ratio of the amount of light that does not enter the second optical system 14 to the total amount of the blue reflected light B1 reflected off the structural element 40.

It is ascertained that the larger the optical element 13, the greater the loss of the blue reflected light B1 caused by the optical element 13, as shown in FIGS. 8A and 8B. The reason for this is that when the optical element 13 has a larger size, the blue reflected light B1 is more likely to be incident on the optical element 13.

When the inclination angle of the inclining surfaces 41a is smaller than 15°, it is ascertained that the loss of the blue reflected light B1 caused by the optical element 13 increases. The reason for this is that when the inclination angle of the inclining surfaces 41a is smaller than 15°, the degree of scattering of the blue reflected light B1 is insufficient, so that the amount of the blue reflected light B1 incident on the optical element 13 increases.

In contrast, it is ascertained that the loss of the blue reflected light B1 caused by the optical element 13 decreases when the inclination angle of the inclining surfaces 41a is set at 15° or greater. The reason for this is that when the inclination angle of the inclining surfaces 41a is greater than or equal to 15°, the degree of scattering of the blue reflected light B1 increases, so that the amount of the blue reflected light B1 incident on the optical element 13 decreases.

On the other hand, when the inclination angle of the inclining surfaces 41a is greater than 30°, it is ascertained that the loss of the blue reflected light B1 caused by the second optical system 14 increases. The reason for this is that when the inclination angle of the inclining surfaces 41a is greater than 30°, the second optical system 14 cannot capture part of the blue reflected light B1. The reason is also that setting the inclination angle of the inclining surfaces 41a at a value greater than 30° increases double reflection that causes the blue reflected light B1 reflected off a protrusion 41 to be reflected again off the protrusions 41 adjacent thereto. Part of the reflected blue light B1 having undergone the double reflection is incident on the optical element 13 again via the second optical system 14 and is caused to return toward the light source 11, resulting in loss.

Based on the aforementioned results of the simulation, the present inventors have set the inclination angle of the inclining surfaces 41a of each of the plurality of protrusions 41 of the structural element 40, that is, the angle between the upper surface 23a of the wavelength conversion layer 23 and the inclining surfaces 41a, at a value greater than or equal to 15° but smaller than or equal to 30° in the illuminator 2 according to the present embodiment.

The illuminator 2 according to the present embodiment allows most of the components of the blue reflected light B1 contained in the illumination light WL to enter the illumination system 16 without traveling via the optical element 13. The configuration described above allows reduction in the proportion of the blue reflected light B1 that is reflected off the optical element 13 so as not to be effectively used as the illumination light WL. That is, the illuminator 2 according to the present embodiment allows suppression of the loss of the blue reflected light B1 outputted from the wavelength converter 15 and hence improvement in the light utilization efficiency of the blue reflected light B1. Furthermore, in the present embodiment, the size of the optical element 13 is reduced by causing the focused first light B to be incident on the optical element 13, whereby the amount of the blue reflected light B1 incident on the optical element 13 can be further reduced.

The illumination system 16, which the illumination light WL enters, includes an optical integration system 31, a polarization converter 32, and a superimposing system 33, as shown in FIGS. 2 and 6. The optical integration system 31 includes a first multi-lens array 31a and a second multi-lens array 31b.

The polarization converter 32 has a configuration in which polarization separation films and retardation films are arranged in an array. The polarization converter 32 aligns the polarization directions of the illumination light WL with a predetermined direction. Specifically, the polarization converter 32 aligns the polarization directions of the illumination light WL with the direction of the transmission axis of the light-incident-side polarizers for the light modulators 4R, 4G, and 4B.

The polarization directions of the red light LR, the green light LG, and the blue light LB separated from the illumination light WL when the illumination light WL passes through the polarization converter 32 thus coincide with the direction of the transmission axis of the light-incident-side polarizers for the light modulators 4R, 4G, and 4B. The red light LR, the green light LG, and the blue light LB are therefore incident on image formation regions of the light modulators 4R, 4G, and 4B, respectively, without being blocked by the light-incident-side polarizers.

The superimposing system 33 along with the second multi-lens array 31b brings images of lenslets of the first multi-lens array 31a into focus in the vicinity of the image formation region of each of the light modulators 4R, 4G, and 4B.

The illuminator 2 according to the present embodiment allows improvement in the light utilization efficiency of the illumination light WL, whereby the brightness of the illumination light WL can be improved and the power consumption of the illuminator 2 can be reduced, or heat generated in the illuminator due to the optical loss can be suppressed.

Effects of First Embodiment

The illuminator 2 according to the present embodiment includes the light source 11, which outputs the first light B, the wavelength converter 15, which converts the first light B into the second light Y, the optical element 13, which reflects the first light B outputted from the light source 11 toward the wavelength converter 15 and transmits the second light Y, and the illumination system 16, which is disposed on the opposite side of the optical element 13 from the wavelength converter 15 and which the illumination light WL emitted from the wavelength converter 15 enters. The wavelength converter 15 includes the substrate 21, the reflection layer 22, which is provided so as to face the upper surface 21a of the substrate 21, the wavelength conversion layer 23, which is provided so as to face the reflection layer 22 and converts the first light B having the first wavelength band into the second light Y having the second wavelength band different from the first wavelength band, and the structural element 40, which is provided so as to face the upper surface 23*a* of the wavelength conversion layer 23 and has the plurality of protrusions 41, which reflect part of the first light B. The plurality of protrusions 41 each have the inclining surfaces 41*a*, which incline with respect to the upper surface 23*a*, and at least part of the blue reflected light B1 reflected off the inclining surfaces 41*a* enters the illumination system 16 without traveling via the optical element 13.

In the illuminator 2 according to the present embodiment, at least part of the blue reflected light B1 reflected off the inclining surfaces 41*a* of each of the protrusions 41 enters the illumination system 16 without traveling via the optical element 13. The illuminator 2 according to the present embodiment therefore allows suppression of the amount of the blue reflected light B1 incident on the optical element 13 and hence improvement in the light utilization efficiency of the illumination light WL.

In the illuminator 2 according to the present embodiment, the angle between the upper surface 23*a* of the wavelength conversion layer 23 and the inclining surfaces 41*a* is greater than or equal to 15° but smaller than or equal to 30°.

The optical loss caused by the optical element 13 can be efficiently reduced by causing the blue reflected light B1 to be reflected off the inclining surfaces 41*a* having an inclination angle set so as to fall within the angular range described above.

In the illuminator 2 according to the present embodiment, the plurality of protrusions 41 of the structural element 40 each have a quadrangular pyramidal shape.

According to the structural element 40 having the plurality of protrusions 41 each having a quadrangular pyramidal shape, the first light B can be isotropically scattered in the four directions and caused to enter the illumination system 16 without being incident on the optical element 13 to generate blue reflected light B1 having a uniform illuminance distribution.

In the illuminator 2 according to the present embodiment, the recesses 24*a* are provided in the upper surface 23*a* of the wavelength conversion layer 23, and at least part of the structural element 40 is formed so as to fill the recesses 24*a*.

The configuration described above increases the area where the structural element 40 is in contact with the wavelength conversion layer 23, and the resultant anchor effect can improve close contact of the structural element 40 with the wavelength conversion layer 23.

In the illuminator 2 according to the present embodiment, the plurality of protrusions of the structural element are made of a material having a refractive index ranging from 1.3 to 1.7.

The configuration described above allows the plurality of protrusions 41 of the structural element 40 to be made of a chemically stable material that absorbs only a small amount of light.

The projector 1 according to the present embodiment includes the illuminator 2, the light modulators 4R, 4G, and 4B, which modulate the light from the illuminator 2 in accordance with image information, and the projection optical apparatus 6, which projects the light modulated by the light modulators 4R, 4G, and 4B.

The projector 1 according to the present embodiment, which includes the illuminator 2, which improves the light usage efficiency of the illumination light WL, can be a projector that operates at high optical efficiency and displays a bright image.

First Variation

A first variation of the first embodiment will subsequently be described. The present variation differs from the first embodiment only in the configuration of the structural element. Therefore, in the following description, the configuration of the structural element will be primarily described, and the same components and members as those in the first embodiment have the same reference characters and will not be described in detail.

Figure 9:
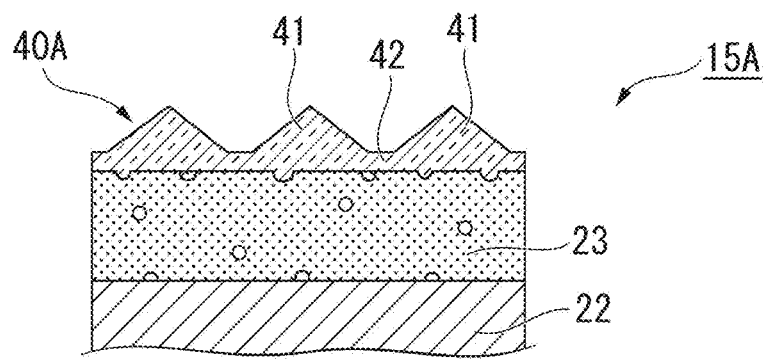
FIG. 9 is a cross-sectional view showing the configuration of the wavelength converter according to a first variation.

FIG. 9 is a cross-sectional view showing the configuration of a wavelength converter 15A according to the present variation.

The wavelength converter 15A according to the present variation includes a substrate that is not shown, the reflection layer 22, the wavelength conversion layer 23, and a structural element 40A, as shown in FIG. 9.

The structural element 40A according to the present variation includes a plurality of protrusions 41 and a flat portion 42 provided between the protrusions 41 adjacent to each other. In the present variation, the plurality of protrusions 41 each have a quadrangular pyramidal shape. The flat portion 42 has a flat surface parallel to the upper surface 23*a* of the wavelength conversion layer 23.

The ratio of the area where the protrusions 41 are disposed to the area of the upper surface 23*a* is hereinafter referred to as a filling ratio of the structural element. The first embodiment has been described with reference to the case where the plurality of protrusions 41 are arranged without gaps therebetween at the upper surface 23*a* of the wavelength conversion layer 23. That is, the first embodiment has been described with reference to the case where the filling ratio of the structural element is 100%.

The present inventors have found through a simulation that the filling ratio of the structural element affects the optical loss caused by the optical element 13.

Figure 10:
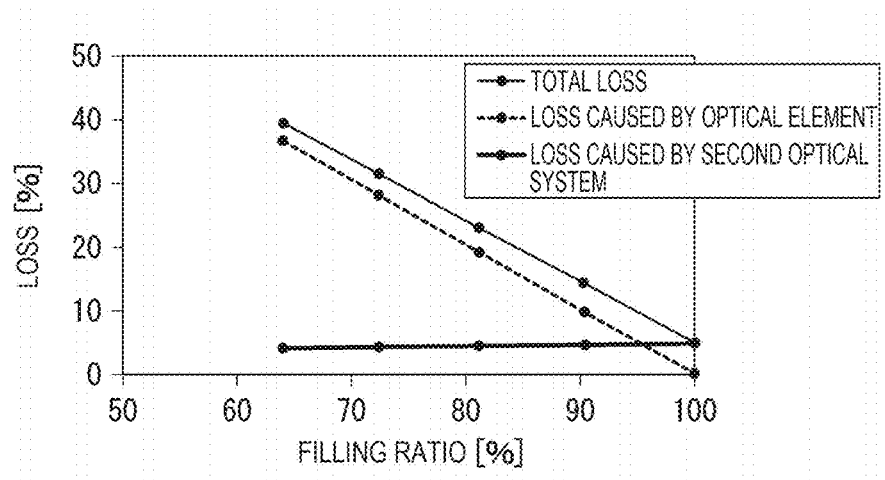
FIG. 10 are graphs showing the relationship between a filling ratio of the structural element and the loss caused by an optical element.

FIG. 10 is a graph showing the relationship between the filling ratio of the structural element and the loss caused by the optical element 13. In FIG. 10, the horizontal axis represents the filling ratio of the structural element, and the vertical axis represents the loss caused by the optical element 13. FIG. 10 further shows not only the relationship between the filling ratio of the structural element and the optical loss caused by the second optical system 14 but also the total loss that is the sum of the optical loss caused by the optical element 13 and the optical loss caused by the second optical system 14.

It is ascertained that the loss caused by the optical element 13 is inversely proportional to the filling ratio of the structural element, as shown in FIG. 10. That is, it can be said that the configuration in the first embodiment, in which the filling ratio is maximized, can minimize the loss caused by the optical element 13.

For example, in the configuration of related art in which no structural element is provided at the upper surface 23*a* of the wavelength conversion layer 23, the loss caused by the optical element 13 is greater than 30%, resulting in a decrease in the light utilization efficiency of the blue reflected light B1. The present inventors have found that setting the filling ratio of the structural element at 70% or greater allows improvement in the light utilization efficiency of the blue reflected light B1 as compared with that in the related-art configuration with no structural element.

Based on the findings described above, in the structural element 40A according to the present variation, the filling ratio of the structural element 40 is set at 70% or greater. Also when the wavelength converter 15A including the structural element 40A according to the present variation is used, the optical loss caused by the optical element 13 can be reduced, as in the first embodiment.

Second Variation

A second variation of the first embodiment will subsequently be described. The present variation differs from the first embodiment only in the configuration of the structural element. Therefore, in the following description, the configuration of the structural element will be primarily described, and the same components and members as those in the first embodiment have the same reference characters and will not be described in detail.

Figure 11:
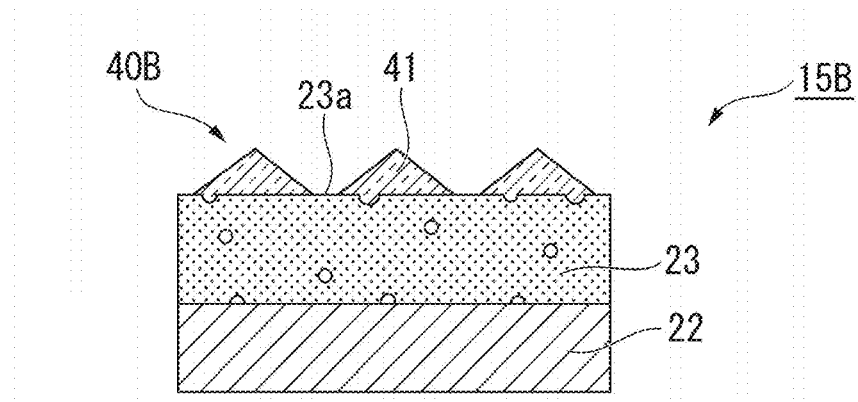
FIG. 11 is a cross-sectional view showing the configuration of the wavelength converter according to a second variation.

FIG. 11 is a cross-sectional view showing the configuration of a wavelength converter 15B according to the present variation.

The wavelength converter 15B according to the present variation includes the substrate 21, the reflection layer 22, the wavelength conversion layer 23, and a structural element 40B, as shown in FIG. 11.

The structural element 40B according to the present variation has a plurality of protrusions 41. The structural element 40B according to the present variation has no portion corresponding to the flat portion 42 of the structural element 40A according to the first variation. That is, in the structural element 40B according to the present variation, the protrusions 41 are discretely provided at the upper surface 23a of the wavelength conversion layer 23, and part of the upper surface 23a is exposed between the protrusions 41 adjacent to each other. In the wavelength converter 15B according to the present variation, the filling ratio of the structural element 40B, when defined in the same way as in the first variation, is set at 70% or greater.

Also in the wavelength converter 15B including the structural element 40B according to the present variation, the light orientation distribution of the blue reflected light B1 can be controlled by the plurality of protrusions 41 of the structural element 40B, in which the protrusions 41 are discretely provided at the upper surface 23a of the wavelength conversion layer 23. The wavelength converter 15B according to the present variation therefore allows reduction in the optical loss caused by the optical element 13, as in the first embodiment.

Second Embodiment

A second embodiment of the wavelength converter will subsequently be described. The present embodiment differs from the first embodiment only in the configuration of the structural element. Therefore, in the following description, the configuration of the structural element will be primarily described, and the same components and members as those in the first embodiment have the same reference characters and will not be described in detail.

Figure 12:
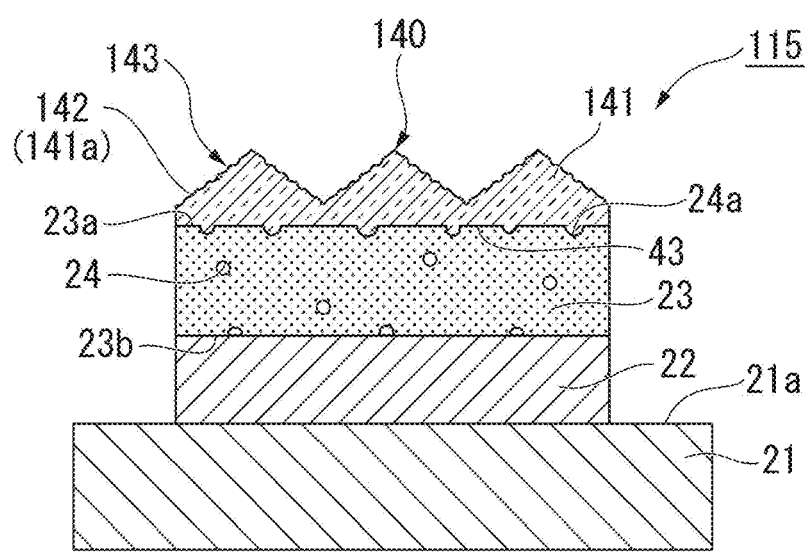
FIG. 12 is a cross-sectional view showing the configuration of the wavelength converter according to a second embodiment.

FIG. 12 is a cross-sectional view showing the configuration of a wavelength converter 115 according to the present embodiment.

The wavelength converter 115 according to the present embodiment includes the substrate 21, the reflection layer 22, the wavelength conversion layer 23, and a structural element 140, as shown in FIG. 12.

The structural element 140 according to the present embodiment has a plurality of protrusions 141. The plurality of protrusions 141 are arranged without gaps therebetween at the upper surface 23a of the wavelength conversion layer 23. The plurality of protrusions 141 each have inclining surfaces 141a, which incline with respect to the upper surface 23a of the wavelength conversion layer 23.

The protrusions 141 in the present embodiment are each so configured that the inclining surfaces 141a each have an unevenly shaped portion 143 having a plurality of tiny recesses 142 smaller than the protrusions 141. The unevenly shaped portion 143 is formed, for example, by sandblasting at the surface of the protrusion 141. The unevenly shaped portion 143 functions as scatterers that scatter light.

FIG. 13 shows the illuminance distribution of the blue reflected light B1. FIG. 13 shows the illumination distribution of the blue reflected light B1 on the light incident surface of the illumination system 16 viewed in the direction along the optical axis 14C of the second optical system 14. FIG. 13 shows illuminance distributions produced when the degree of scattering at the inclining surfaces of each of the protrusions is successively increased in the direction in which the arrows in FIG. 13 are oriented. FIG. 7 shows the illuminance distribution at the structural element 40 in the first embodiment corresponding to "no scattering" in FIG. 13.

In the present embodiment, in which the unevenly shaped portion 143 functions as scatterers, the blue reflected light B1 is by a greater degree scattered by and reflected off the unevenly shaped portion 143 provided at the inclining surfaces 141a of each of the protrusions 141. Providing each of the inclined surfaces 141a with the unevenly shaped portion 143 therefore allows four luminous fluxes BS, which form the blue reflected light B1, to spread by a greater amount, as shown by the illuminance distribution labeled with "Degree of scattering: medium" in FIG. 13, than those reflected off the structural element 40 in the first embodiment. Furthermore, changing the shape of the unevenly shaped portion 143 allows an increase in the degree of scattering, as shown by the illuminance distribution labeled with "Degree of scattering: high" in FIG. 13, and the four luminous fluxes, which form the blue reflected light B1, therefore spread by a still greater amount, so that end portions of the luminous fluxes BS partially overlap with each other, whereby the uniformity of the illuminance distribution of the blue reflected light B1 is further improved.

The wavelength converter 115 according to the present embodiment allows the illuminance distribution of the blue reflected light B1 to be homogenized with the optical loss of the blue reflected light B1 caused by the optical element 13 reduced. The blue reflected light B1 can thus be closer in the illuminance distribution to the second light Y, whereby color unevenness of the illumination light WL containing the blue reflected light B1 and the second light Y can be reduced.

Third Embodiment

A third embodiment of the wavelength converter will subsequently be described. The present embodiment differs from the first embodiment only in the configuration of the structural element. Therefore, in the following description, the configuration of the structural element will be primarily described, and the same components and members as those in the first embodiment have the same reference characters and will not be described in detail.

Figure 14A:
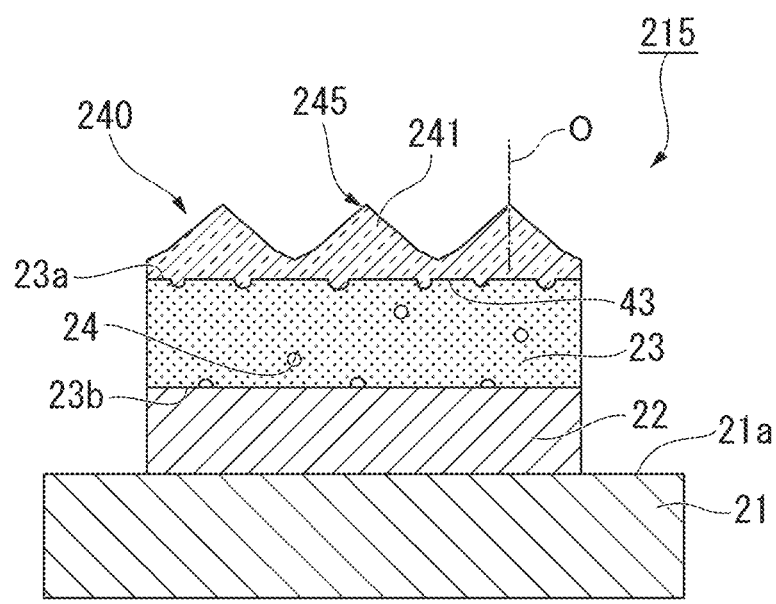
FIG. 14A is a cross-sectional view showing the configuration of the wavelength converter according to a third embodiment.

FIG. 14A is a cross-sectional view showing the configuration of a wavelength converter 215 according to the present embodiment.

The wavelength converter 215 according to the present embodiment includes the substrate 21, the reflection layer 22, the wavelength conversion layer 23, and a structural element 240, as shown in FIG. 14A.

The structural element 240 in the present embodiment has a plurality of protrusions 241. The plurality of protrusions 241 are arranged without gaps therebetween at the upper surface 23a of the wavelength conversion layer 23. The plurality of protrusions 241 each have inclining surfaces 243, which incline with respect to the upper surface 23a of the wavelength conversion layer 23. The protrusions 241 in the present embodiment each have an apex 245, which is the portion closest to the optical element 13. In the present embodiment, the apex 245 is located on the center axis O of each of the protrusions 241.

Figure 14B:
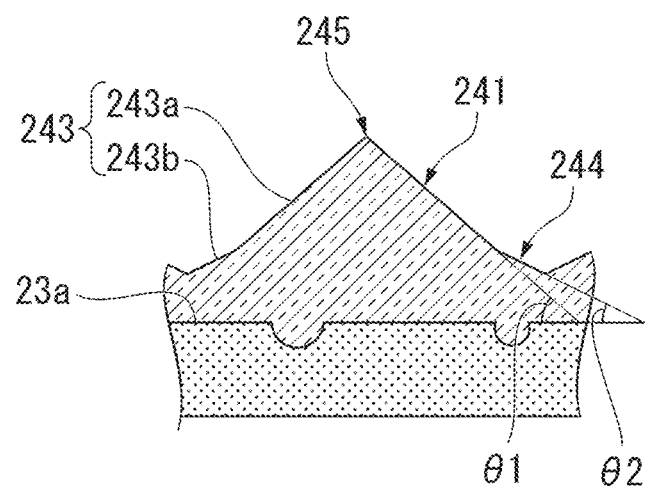
FIG. 14B is an enlarged cross-sectional view of key parts of the wavelength converter according to the third embodiment.

FIG. 14B is an enlarged cross-sectional view of key parts of each of the protrusions 241.

The protrusions 241 in the present embodiment each have a substantially quadrangular pyramidal shape with an extending skirt 244 located on the side facing the upper surface 23a of the wavelength conversion layer 23, as shown in FIG. 14B. Specifically, the inclining surfaces 243 of each of the protrusions 241 each have a first inclining surface 243a, which is located on the side facing the apex 245, and a second inclining surface 243b, which is located on the opposite side from the apex 245. Let θ1 be a first angle between the upper surface 23a of the wavelength conversion layer 23 and the first inclining surface 243a, and θ2 be a second angle between the upper surface 23a of the wavelength conversion layer 23 and the second inclining surface 243b, and the second angle θ2 is smaller than the first angle θ1. The second inclining surface 243b is provided on the side facing the upper surface 23a of the wavelength conversion layer 23.

In the present embodiment, the first angle θ1 and the second angle θ2 are each desirably set at a value greater than or equal to 15° but smaller than or equal to 30°. It is, however, noted that the second angle θ2 may be set at a value smaller than 15° depending on the illuminance distribution of the blue reflected light B1.

When the inclination angle of the first inclining surfaces 243a (first angle θ1) is reduced, the proportion of the blue reflected light B1 incident on the optical element 13 undesirably increases.

In contrast, the wavelength converter 215 according to the present embodiment, in which the second inclining surface 243b at each of the skirts 244 of the structural element 240 has a small inclination angle (second angle θ2), allows an increase in the degree of scattering of the blue reflected light B1 to homogenize the illuminance distribution of the blue reflected light B1 with the amount of the blue reflected light B1 incident on the optical element 13 suppressed.

Figure 15:
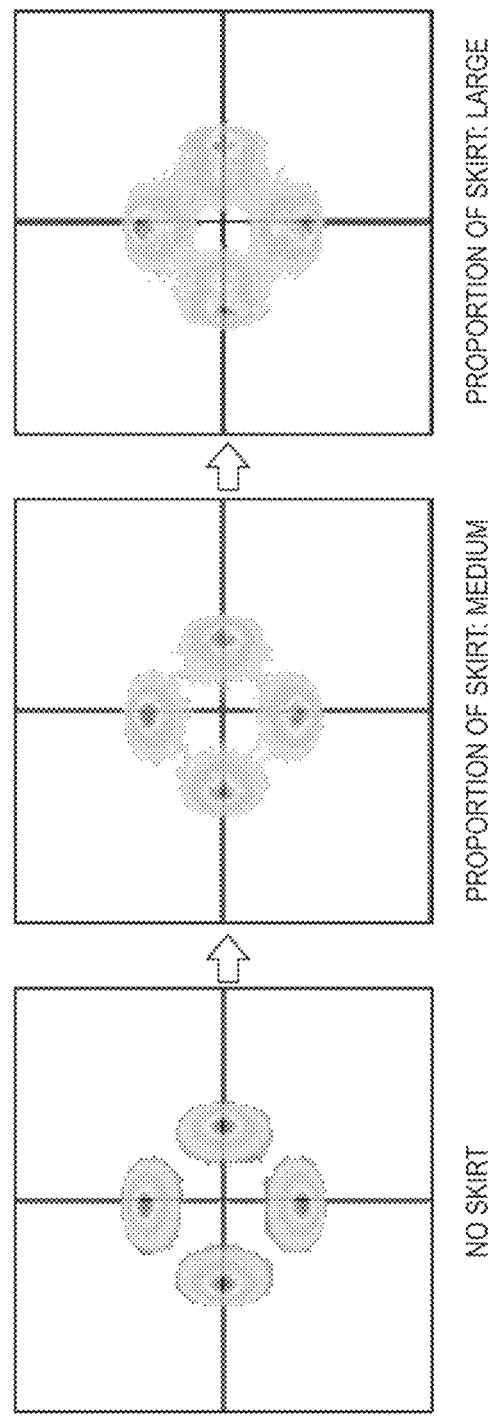
FIG. 15 shows the illuminance distribution of the blue reflected light in the third embodiment.

FIG. 15 shows the illuminance distribution of the blue reflected light B1. FIG. 15 shows the illumination distribution of the blue reflected light B1 on the light incident surface of the illumination system 16 viewed in the direction along the optical axis 14C of the second optical system 14. FIG. 15 shows illuminance distributions produced when the proportion of the skirt 244 of each of the protrusions 241 is successively increased in the direction in which the arrows in FIG. 15 are oriented. FIG. 7 shows the illuminance distribution at the structural element 40 in the first embodiment corresponding to "no skirt" in FIG. 15. That is, FIG. 7 shows the illuminance distribution at the structural element 40 in the first embodiment corresponding to "θ1=θ2" in FIG. 15.

The proportion of the skirt 244 of each of the protrusions 241 is defined as the ratio of the area of the portion having the second inclining surface 243b to the area of the portion having the first inclining surface 243a when viewed in the direction along the center axis O of the protrusion 241.

In the present embodiment, the blue reflected light B1 is scattered by and reflected off the first inclining surface 243a and the second inclining surface 243b of each of the protrusions 241 in different directions. Using the structural element 240 therefore allows the four luminous fluxes BS, which form the blue reflected light B1, to spread by a greater amount than the structural element 40 in the first embodiment, as shown by the illuminance distribution labeled with "Proportion of skirt: medium" in FIG. 15. The "Proportion of skirt: medium" in FIG. 15 means that the proportion of the skirt 244 of each of the protrusions 241 is 29%.

Further increasing the proportion of the skirt 244 allows the four luminous fluxes BS, which form the blue reflected light B1, to spread by a still greater amount, so that end portions of the luminous fluxes BS partially overlap with each other, as shown by the illuminance distribution labeled with "Proportion of skirt: large" in FIG. 15, whereby the uniformity of the illuminance distribution of the blue reflected light B1 is further improved. The "Proportion of skirt: large" in FIG. 15 means that the proportion of the skirt 244 of each of the protrusions 241 is 55%.

The wavelength converter 215 according to the present embodiment, in which the inclination angle of the second inclining surface 243b at each of the skirts 244 of the structural element 240 is relatively reduced to homogenize the illuminance distribution of the blue reflected light B1 by a greater degree while reducing the optical loss of the blue reflected light B1 caused by the optical element 13, allows reduction in the color unevenness of the illumination light WL.

Fourth Embodiment

A fourth embodiment of the wavelength converter will subsequently be described. The present embodiment differs from the first embodiment only in the configuration of the structural element. Therefore, in the following description, the configuration of the structural element will be primarily described, and the same components and members as those in the first embodiment have the same reference characters and will not be described in detail.

Figure 16:
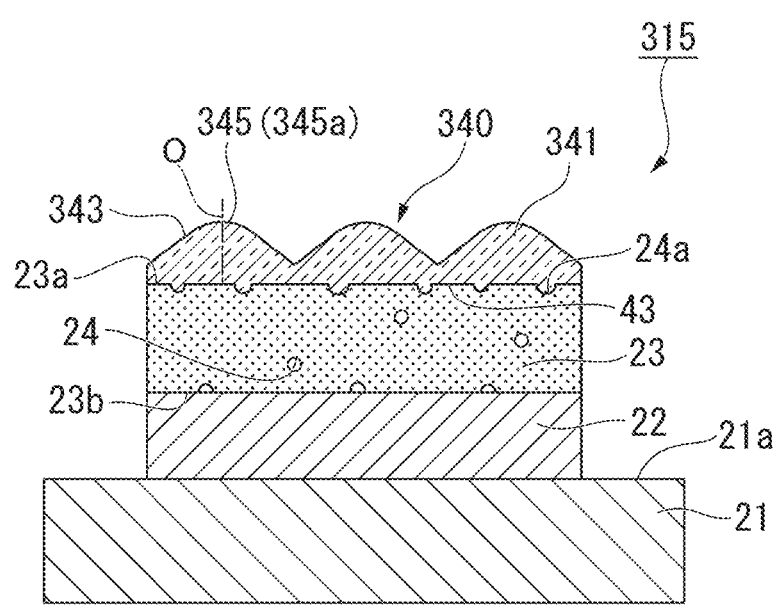
FIG. 16 is a cross-sectional view showing the configuration of the wavelength converter according to a fourth embodiment.

FIG. 16 is a cross-sectional view showing the configuration of a wavelength converter 315 in the present embodiment.

The wavelength converter 315 in the present embodiment includes the substrate 21, the reflection layer 22, the wavelength conversion layer 23, and a structural element 340, as shown in FIG. 16.

The structural element 340 in the present embodiment has a plurality of protrusions 341. The plurality of protrusions 341 are arranged without gaps therebetween at the upper surface 23a of the wavelength conversion layer 23. The plurality of protrusions 341 each have inclining surfaces 343, which incline with respect to the upper surface 23a of the wavelength conversion layer 23. The protrusions 341 in the present embodiment each have an apex 345, which is the portion closest to the optical element 13. In the present embodiment, the apex 345 is located on the center axis O of each of the protrusions 341.

In each of the protrusions 341 in the present embodiment, a surface 345a of the apex 345 is a curved surface having curvature. The wavelength converter 315 in the present embodiment, in which the surface 345a of each of the apices 345 is a curved surface, allows an increase in the degree of scattering of the blue reflected light B1 to further homogenize the illuminance distribution of the blue reflected light B1.

Figure 17:
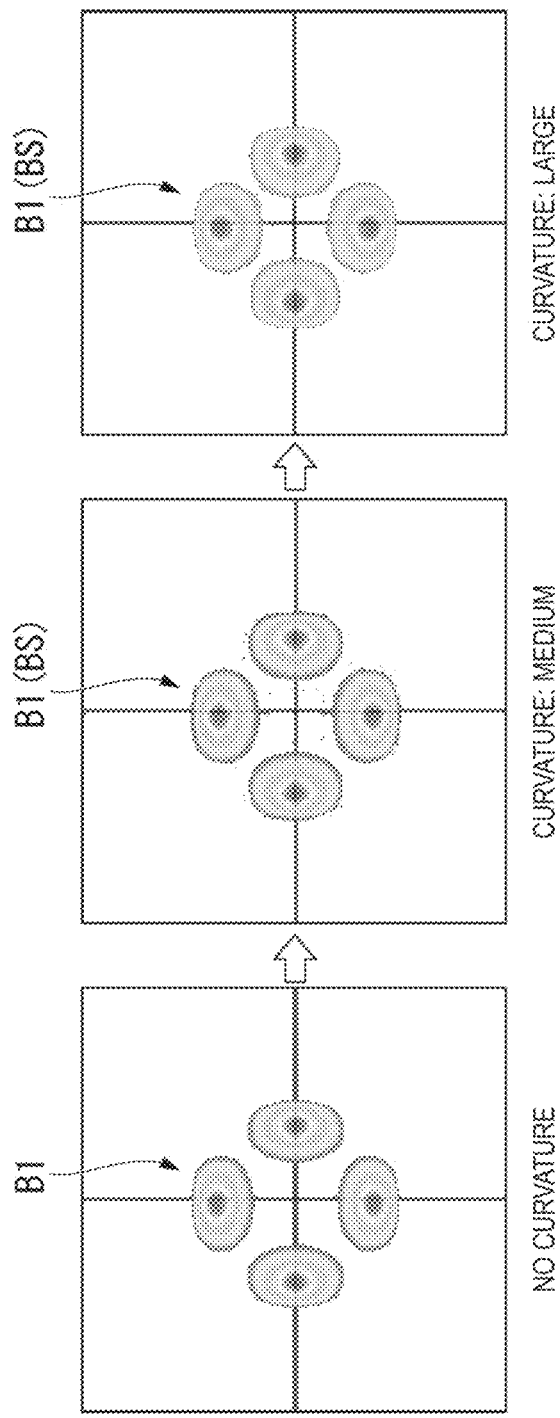
FIG. 17 shows the illuminance distribution of the blue reflected light in the fourth embodiment.

FIG. 17 shows the illuminance distribution of the blue reflected light B1. FIG. 17 shows the illuminance distribution of the blue reflected light B1 on the light incident surface of the illumination system 16 viewed in the direction along the optical axis 14C of the second optical system 14. FIG. 17 shows illuminance distributions produced when the curvature of the curved surface of each of the apices 345 is successively increased in the direction in which the arrows in FIG. 17 are oriented. FIG. 7 shows the illuminance distribution at the structural element 40 in the first embodiment corresponding to "no curvature" in FIG. 17.

In the present embodiment, the blue reflected light B1 is scattered and reflected in different directions in accordance with the curvature of the curved surface of each of the apices 345. The four luminous fluxes BS, which form the blue reflected light B1, can therefore be brought closer to the optical element 13 while the curved surface of the surface 345a of each of the apices 345 spreads the luminous fluxes BS by a greater amount than the structural element 40 in the first embodiment, as shown in the illuminance distribution labeled with "curvature: medium" in FIG. 17. "Curvature: medium" in FIG. 17 means that the radius of curvature of the curved surface is 3 μm.

When the curvature of the curved surface of the surface 345a of each of the apices 345 is further increased, the four luminous fluxes BS, which form the blue reflected light B1, further spread out, as shown in the illuminance distribution labeled with "Curvature: large" in FIG. 17, whereby the gap between the luminous fluxes BS decreases. The uniformity of the illuminance distribution of the blue reflected light B1 can thus be further improved. "Curvature: large" in FIG. 17 means that the radius of curvature of the curved surface is 5 μm.

The wavelength converter 315 according to the present embodiment, in which the apex 345 of each of the protrusions 341 is formed of a curved surface to homogenize the illuminance distribution of the blue reflected light B1 by a greater degree while reducing the optical loss of the blue reflected light B1 caused by the optical element 13, allows reduction in the color unevenness of the illumination light WL.

The technical scope of the present disclosure is not limited to the embodiments described above, and a variety of changes can be made thereto to the extent that the changes do not depart from the substance of the present disclosure.

Figure 18:
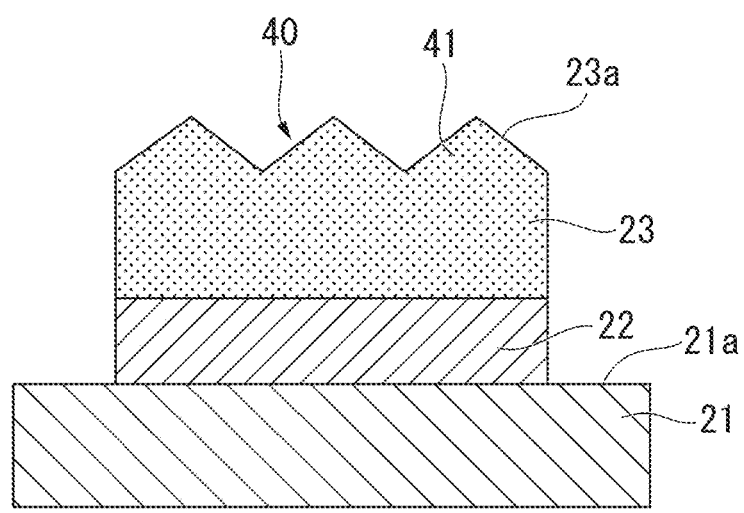
FIG. 18 shows a configuration in which the structural element and a wavelength conversion layer are integrated with each other.

For example, in the embodiments and variations described above, the structural element and the wavelength conversion layer are formed separately from each other, and the structural element and the wavelength conversion layer may instead be integrated with each other. FIG. 18 shows a configuration in which the structural element and the wavelength conversion layer are integrated with each other. FIG. 18 shows the case where the structural element and the wavelength conversion layer are integrated with each other in the first embodiment by way of example, and the structural element and the wavelength conversion layer may be integrated with each other also in the other embodiments and variations.

A configuration in which the structural element 40 is formed directly at the upper surface 23a of the wavelength conversion layer 23 as shown in FIG. 18 allows elimination of the step of forming the structural element 40, whereby the cost of the wavelength converter 15 can be reduced. Since the structural element 40 and the wavelength conversion layer 23 have the same refractive index, there is no interface reflection between the structural element 40 and the wavelength conversion layer 23, so that the light is unlikely to leak laterally, whereby the etendue can be reduced.

The protrusions do not necessarily each have a quadrangular pyramidal shape and may instead each have a hexagonal pyramidal shape or a conical shape. The shape of each of the protrusions may be selected in accordance with the shape of the optical element 13. For example, when the optical element 13 has a circular shape and the protrusions each have a conical shape, the illuminance distribution of the blue reflected light can be formed so as to surround the optical element 13.

For example, in the embodiments described above, the wavelength converter 15 employs an immobile structure in which the wavelength conversion layer 23 is not moved relative to the first light B and may instead employ a wheel-based structure in which the wavelength conversion layer 23 is rotated relative to the first light B.

In addition to the above, the specific descriptions of the shape, the number, the arrangement, the material, and other factors of the components of the illuminator and the projector are not limited to those in the embodiments described above and can be changed as appropriate. The aforementioned embodiments have been described with reference to the case where the illuminator according to the present disclosure is incorporated in a projector using liquid crystal light valves, but not necessarily. The illuminator according to the present disclosure may be used in a projector using a digital micromirror device as each of the light modulators. The projector may not include a plurality of light modulators and may instead include only one light modulator.

The aforementioned embodiments have been described with reference to the case where the illuminator according to the present disclosure is used in a projector, but not necessarily. The illuminator according to the present disclosure can be used as a lighting apparatus, a headlight of an automobile, and other components.

An illuminator according to an aspect of the present disclosure may have the configuration below.

The illuminator according to the aspect of the present disclosure includes a light source that outputs light having a first wavelength band, a wavelength converter that converts the light having the first wavelength band into light having a second wavelength band different from the first wavelength band, an optical element that reflects the light having the first wavelength band outputted from the light source toward the wavelength converter and transmits the light having the second wavelength band, and an illumination system which is disposed on the opposite side of the optical element from the wavelength converter and which the light emitted from the wavelength converter enters. The wavelength converter includes a substrate having a first surface, a reflection layer provided so as to face the first surface, a wavelength conversion layer that has a second surface, is provided so as to face the reflection layer, and converts the light having the first wavelength band into the light having the second wavelength band, and a structural element provided so as to face the second surface and having a plurality of protrusions that reflect part of the light having the first wavelength band. The plurality of protrusions each have an inclining surface that inclines with respect to the second surface. At least part of the light having the first wavelength band and reflected off the inclining surface enters the illumination system without traveling via the optical element.

In the illuminator according to the aspect of the present disclosure, the angle between the second surface and the inclining surface may be greater than or equal to 15° but smaller than or equal to 30°.

In the illuminator according to the aspect of the present disclosure, the inclining surface may have an unevenly shaped portion.

In the illuminator according to the aspect of the present disclosure, the plurality of protrusions may each have an apex, the inclining surface may have a first inclining surface located on the side facing the apex and a second inclining surface located on the side opposite from the apex, and a second angle between the second surface and the second inclining surface may be smaller than a first angle between the second surface and the first inclining surface.

In the illuminator according to the aspect of the present disclosure, the plurality of protrusions may each have an apex, and the surface of the apex may have curvature.

In the illuminator according to the aspect of the present disclosure, the plurality of protrusions of the structural element may each have a quadrangular pyramidal shape.

In the illuminator according to the aspect of the present disclosure, the second surface of the wavelength conversion layer may be provided with a recess, and at least part of the structural element may be formed so as to fill the recess.

In the illuminator according to the aspect of the present disclosure, the plurality of protrusions of the structural element may be made of a material having a refractive index ranging from 1.3 to 1.7.

In the illuminator according to the aspect of the present disclosure, the structural element may be integrated with the wavelength conversion layer.

A projector according to another aspect of the present disclosure may have the configuration below.

The projector according to the other aspect of the present disclosure may include the illuminator according to the aspect of the present disclosure, a light modulator that modulates the light from the illuminator in accordance with image information, and a projection optical apparatus that projects the light modulated by the light modulator.

What is claimed is:

1. An illuminator comprising:
   a light source that outputs first light having a first wavelength band;
   a wavelength converter that converts the first light into second light having a second wavelength band different from the first wavelength band;
   an optical element that reflects the first light outputted from the light source toward the wavelength converter and transmits the second light; and
   an illumination system which is disposed on an opposite side of the optical element from the wavelength converter and which light emitted from the wavelength converter enters,
   wherein the wavelength converter includes
   a substrate having a first surface,
   a reflection layer facing the first surface,
   a wavelength conversion layer having a second surface and facing the reflection layer, the wavelength conversion layer being configured to convert the first light into the second light, and
   a structural element facing the second surface and having a plurality of protrusions that reflect part of the first light,
   the plurality of protrusions each have an inclining surface that inclines with respect to the second surface, and
   at least part of the first light reflected off the inclining surface enters the illumination system without traveling via the optical element.

2. The illuminator according to claim 1, wherein an angle between the second surface and the inclining surface is greater than or equal to 15° and is smaller than or equal to 30°.

3. The illuminator according to claim 1, wherein the inclining surface has an unevenly shaped portion.

4. The illuminator according to claim 1, wherein the plurality of protrusions each have an apex, the inclining surface has a first inclining surface located on a side facing the apex and a second inclining surface located on an opposite side of the apex, and a second angle between the second surface and the second inclining surface is smaller than a first angle between the second surface and the first inclining surface.

5. The illuminator according to claim 1, wherein the plurality of protrusions each have an apex, and a surface of the apex has curvature.

6. The illuminator according to claim 1, wherein the plurality of protrusions of the structural element each have a quadrangular pyramidal shape.

7. The illuminator according to claim 1, wherein the second surface of the wavelength conversion layer is provided with a recess, and at least part of the structural element fills the recess.

8. The illuminator according to claim 1, wherein the plurality of protrusions of the structural element is made of a material having a refractive index ranging from 1.3 to 1.7.

9. The illuminator according to claim 1, wherein the structural element is integrated with the wavelength conversion layer.

10. A projector comprising:
the illuminator according to claim 1;
a light modulator that modulates light emitted from the illuminator in accordance with image information; and
a projection optical apparatus that projects the light modulated by the light modulator.

* * * * *